No. 614,738. Patented Nov. 22, 1898.
H. N. MARVIN.
CONSECUTIVE VIEW APPARATUS.
(Application filed Apr. 21, 1897.)
(No Model.) 2 Sheets—Sheet 1.
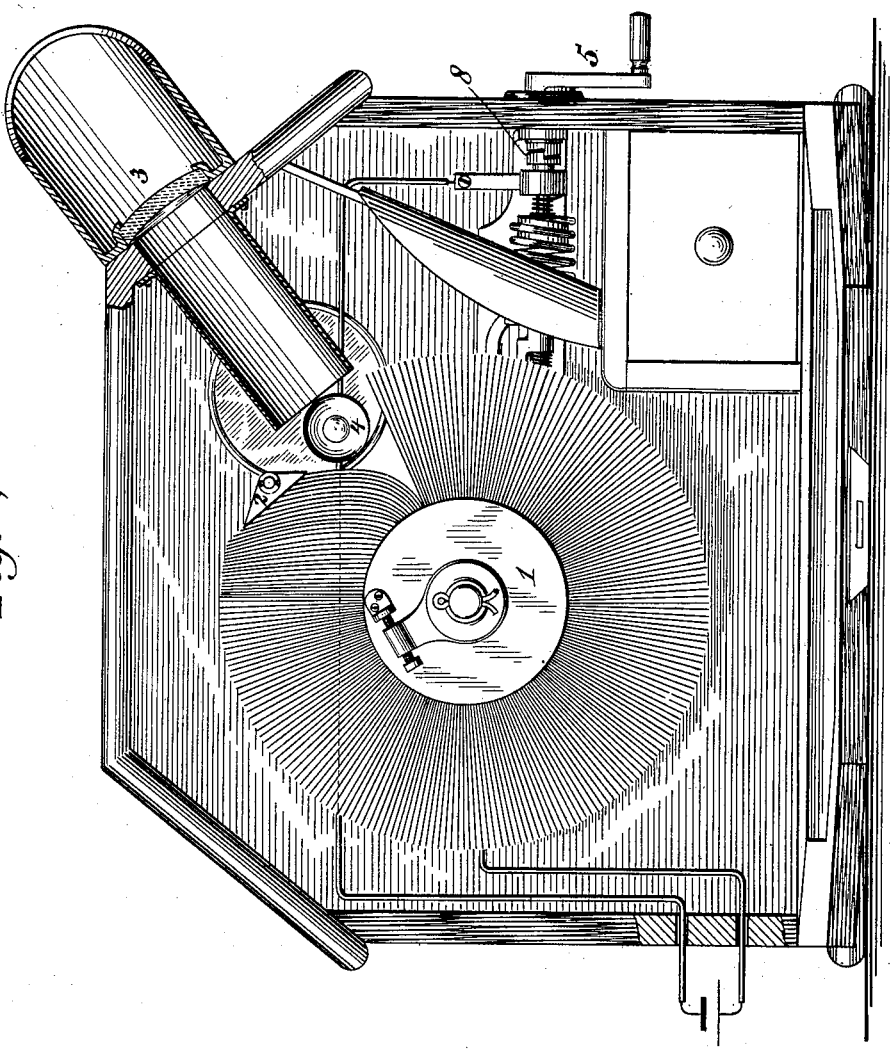
WITNESSES:
INVENTOR
BY
ATTORNEYS No. 614,738. Patented Nov. 22, 1898.
H. N. MARVIN.
CONSECUTIVE VIEW APPARATUS.
(Application filed Apr. 21, 1897.)
(No Model.) 2 Sheets—Sheet 2.
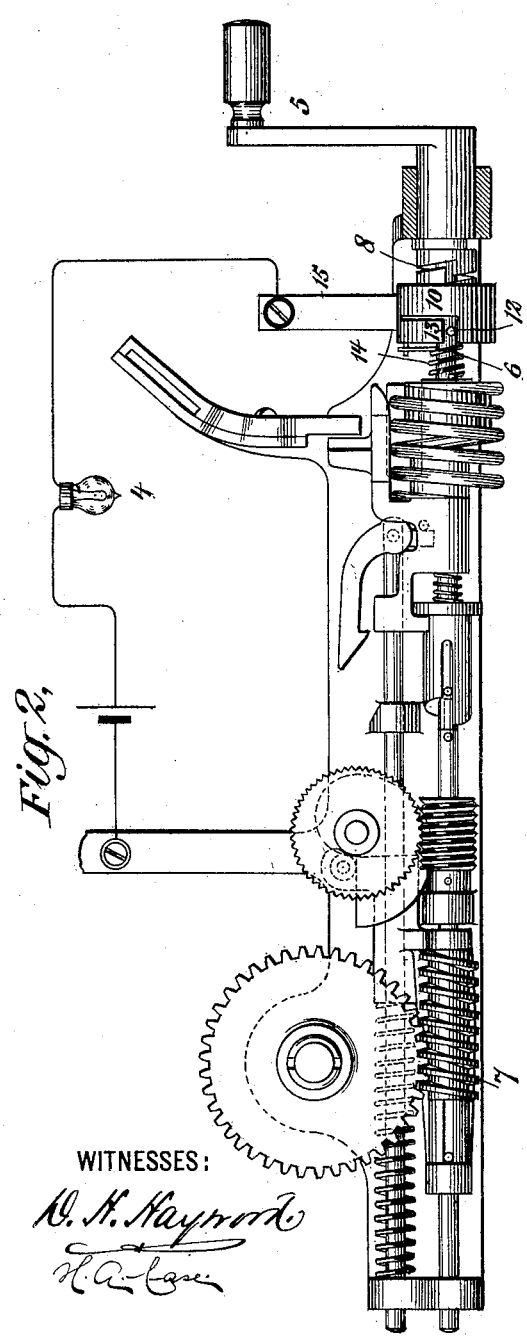
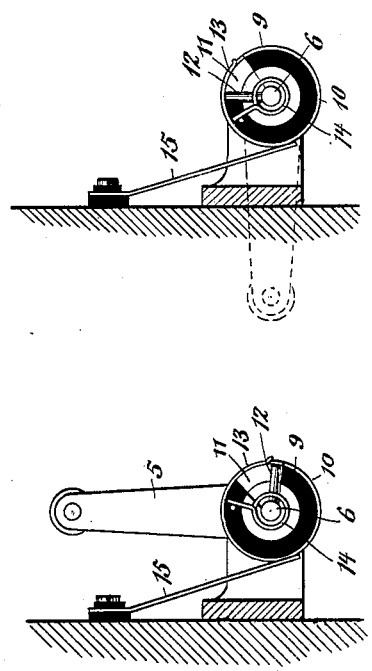
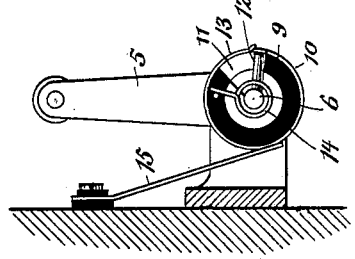
WITNESSES:
INVENTOR
H. N. Marvin
BY
ATTORNEYS.

UNITED STATES PATENT OFFICE.

HARRY NORTON MARVIN, OF NEW YORK, N. Y., ASSIGNOR TO THE AMERICAN MUTOSCOPE COMPANY, OF SAME PLACE.

CONSECUTIVE-VIEW APPARATUS.

SPECIFICATION forming part of Letters Patent No. 614,738, dated November 22, 1898.

Application filed April 21, 1897. Serial No. 633,122. (No model.)

*To all whom it may concern:*

Be it known that I, HARRY NORTON MARVIN, a citizen of the United States, residing at New York, in the county of New York and State of New York, have invented a new and useful Improvement in Consecutive-View Apparatus; and I do hereby declare the following to be a full, clear, and exact description of the invention, such as will enable others skilled in the art to which it appertains to make and use the same.

My invention relates to consecutive-view apparatus, and particularly to hand-operated consecutive-view-exhibition apparatus, such as the mutoscope covered by Letters Patent No. 549,309, dated November 5, 1895, granted to Herman Casler; and my invention consists in the means for illuminating the several views as they pass into the field of view of the apparatus and for cutting off the light when the operation of the apparatus ceases and in the novel combination, construction, and arrangement of the parts of the apparatus.

The objects of my invention are, first, to provide means for illuminating the views of consecutive-view-exhibition apparatus as said views pass into the field of view of the apparatus and for cutting off the light automatically as soon as the operation of the apparatus ceases, and, secondly, to make the mechanism which controls the illumination of the views simple and compact, not liable to get out of order, and inexpensive. These objects are attained in the automatic switch herein described, and illustrated in the drawings which accompany and form a part of this specification, in which the same reference-numerals indicate the same or corresponding parts, and in which—

Figure 1 is a vertical section of a mutoscope, such as is covered by Letters Patent No. 549,309, of November 5, 1895, granted to Herman Casler, with my invention applied thereto. Fig. 2 is a detail elevation of the driving mechanism of the mutoscope on a larger scale, showing the switch more clearly; and Figs. 3 and 4 are transverse sections of the driving mechanism through the center of the switch, showing the parts of the switch in the "on" and "off" positions, respectively.

The mutoscope in connection with which my invention is illustrated in the drawings is an apparatus designed to reproduce to the eye the motions of moving objects by means of a consecutive series of pictures of those objects in different positions, the pictures being mounted upon a series of resilient cards which are mounted upon a moving carrier, which in Fig. 1 is a reel 1, and are carried by this carrier past a detent 2, which holds each card back for a time and bends it backward, so that when the card finally escapes from the detent it springs forward rapidly. In the inclosing case of the mutoscope there is an observation-opening 3, through which each card may be viewed as it is held backward by the detent. The face of the card which is toward the observation-opening 3 when it is held back by the detent 2 is the face which carries the picture. When a card escapes from the detent, it passes the observation-opening so rapidly that the motion of the card is not perceptible, the next succeeding card being presented to view. The carrier 1 is rotated by a suitable driving-gear, which in the apparatus shown in the drawings is a worm-gear.

It is desirable to illuminate the pictures on the cards brilliantly as they are presented to the eye of the observer, and for this purpose a small incandescent electric lamp 4 is employed; but as the apparatus is operated only at intervals it is desirable that this lamp shall be lighted only when the mutoscope is actually in use, so as to avoid waste of electric current. This is accomplished automatically by the hereinafter-described switch.

The mutoscope as ordinarily constructed is arranged to be operated by hand, a crank being provided which, when rotated, rotates a driving-shaft and communicates motion to a worm-gear which rotates the reel 1. In the drawings, 5 is the crank, 6 the driving-shaft, and 7 the worm of the worm-gear. As ordinarily constructed the connection between the driving-shaft 6 and the worm 7 is through a coin-controlled clutch, many of the parts of which are shown in Figs. 1 and 2; but the clutch forms no portion of this invention, and a clutch between the shaft 6 and the worm 7 may or may not be used, as preferred. It is not necessary, therefore, to describe or to illustrate fully this clutch. As shown in Figs. 1 and 2 also, the crank 5 is connected to the shaft 6 by a jaw-clutch 8; but this clutch is used for a purpose foreign to the present invention and need not be considered here except as it affects the particular construction of the switch illustrated.

Upon the inner section of the clutch 8 is mounted an insulating-bushing 9, Figs. 3 and 4, surrounded by a metal sleeve 10. In the bushing 9 is a slot 11, in which a pin 12, connected with the shaft 6, works. The sleeve 10 has a spring-tongue 13, corresponding in position to this slot. The section of the coupling 8 upon which the bushing 9 is mounted is loose upon the shaft 6, the shaft being driven, therefore, by contact with the bushing at one end of the slot 11 or by friction with the tongue 13. The pin is of such length and the tongue 13 is so shaped that when the crank is rotating the shaft 6, the parts being in the position shown in Fig. 3, the pin 12 and the tongue 13 are in electrical contact, while when the pin 12 is at the other end of the slot 11, in the position shown in Fig. 4, the pin and the tongue 13 are not in contact.

A spiral spring 14 is fastened at one end to the shaft 6 and at the other end presses against a pin projecting from the insulating-bushing 9. This spring acts to press the sections of the clutch 8 together, but also tends to turn the bushing 9, and therefore the parts of the clutch 8 and the crank 5, backward into the position shown in Fig. 4, in which position the pin 12 and spring-tongue 13 are not in contact. In other words, the crank 5 has a loose connection with the shaft 6, and the spring 14 tends to hold the crank out of driving connection with the shaft.

A brush 15 makes contact with the sleeve 10. To this brush one electric conductor of the circuit of lamp 4 is connected, the other conductor being connected to any portion of the mechanism which is in electrical connection with the shaft 6.

The operation of the switch is as follows: Normally the parts of the switch are in the position shown in Fig. 4, the circuit being broken. When the crank 5 is revolved, however, the bushing 9 is revolved until the pin 12 reaches the end of the slot 11, and is then caused to rotate with the bushing or until the friction with the tongue 13 becomes sufficiently great to rotate the shaft 6. In either case as soon as electrical contact is established between the pin 12 and the tongue 13 the lamp 4 is lighted. As soon as the operator removes his hand from the crank 5, however, the spring 14, the tension of which was increased by the motion of the bushing 9 on the shaft 6, moves this bushing and the crank 5 backward, breaking contact between the pin 12 and tongue 13, and if the shaft 6 is connected to the worm 7 through a coin-controlled clutch, as illustrated, or through any other kind of clutch then when the clutch is not engaged the resistance to the turning of the shaft 6 is so slight that the spring 14 does not permit the pin 12 and tongue 13 to come in contact, so that turning the crank 5 without throwing the clutch into engagement does not turn on the light; also, if the clutch which connects the shaft 6 and the worm 7 disengages automatically after a predetermined number of revolutions then the resistance to the revolution of the shaft 6 being removed the spring 14 moves the shaft onward sufficiently to break contact between the pin 12 and tongue 13, turning off the light. The friction between the pin 12 and tongue 13 keeps the contact-surfaces clean and insures good contact at all times.

My invention is not limited in its application to the particular type of exhibition device illustrated or to the particular driving mechanism illustrated, but may be used in any exhibition apparatus driven by an operator and with any type of driving mechanism.

Having thus completely described my invention, what I claim, and desire to secure by Letters Patent, is—

1. In a consecutive-view apparatus, the combination, with mechanism for moving a series of views through the field of the apparatus, of a driving device for said mechanism adapted to be operated by an observer, means for illuminating the views, and an automatic cut-off device, operated when said driving device is released by the observer, for stopping the illumination of the apparatus, substantially as described.

2. In a consecutive-view apparatus, the combination, with a view-carrier, a driving device adapted to be operated by an observer, and mechanism for transmitting motion from the driving device to the view-carrier, including means for throwing the driving device out of driving connection with the view-carrier whenever said driving device is released, of an electric lamp, the circuit of which passes through contact-points which are in contact only while said driving device is in driving connection with the view-carrier, substantially as described.

3. In a consecutive-view-exhibition apparatus, the combination, with mechanism for passing a series of views through the field of the apparatus, an operating-handle, and means connecting said handle with said mechanism whereby the same may be operated, of a lamp for illuminating said views, a circuit therefor, a switch through which said circuit passes arranged to be closed when said handle is rotated in a forward direction and to be opened when said handle is rotated in reverse direction, and means for rotating said handle automatically in the reverse direction as soon as the same is released, thereby opening the switch, substantially as described.

4. In a consecutive-view-exhibition apparatus, the combination, with mechanism for moving a series of views through the field of the apparatus, an operating-handle for operating said mechanism, an electric lamp for illuminating the several views, and a circuit therefor, of means for holding said operating-handle normally out of driving connection with the mechanism, and a switch controlling the circuit of said lamp and arranged to be closed and opened by moving the operating-handle into and out of driving connection with said mechanism, substantially as described.

5. In a consecutive-view-exhibition apparatus, the combination, with mechanism for passing a series of views through the field of the apparatus, an operating-handle for operating said mechanism, an electric lamp for illuminating the several views, and a circuit therefor, of a spring for holding said operating-handle normally out of driving connection with the mechanism, and a switch controlling the circuit of said lamp, arranged to be closed and opened by moving the operating-handle into and out of driving connection, substantially as described.

6. In a mutoscope, the combination, with a picture-reel, a series of pictures thereon, means for exposing the same, successively, as the reel rotates, and an electric lamp for illuminating said pictures, of a driving-shaft geared to said reel, an operating-handle, means for holding said handle normally out of driving connection with said shaft, and a switch controlling the circuit of said lamp and arranged to be closed and opened by moving the operating-handle into and out of driving connection with said shaft, substantially as described.

7. In a mutoscope, the combination, with a picture-reel, a series of pictures thereon, means for exposing the same, successively, as the reel rotates, and an electric lamp for illuminating said pictures, of a driving-shaft geared to said reel, a contact-piece loosely mounted on said shaft but insulated therefrom, a second contact-piece on said shaft and having electrical connection therewith, an operating-handle arranged to rotate said insulated contact-piece so as to bring the same into electrical and driving contact with said shaft contact-piece, a spring tending to move said contact-pieces out of electrical and driving contact, a brush for transmitting current to said insulated contact-piece, and a circuit for said lamp passing through said brush and contact-pieces when the same are in contact, substantially as described.

In testimony whereof I affix my signature in presence of two witnesses.

HARRY NORTON MARVIN.

Witnesses:
   CHANNING F. MEEK,
   O. E. MADDEN.